March 21, 1961     L. RABB     2,975,426
INTEGRAL ONE-PIECE FOLDING OPTICAL FRAME
Filed Dec. 9, 1959

*INVENTOR.*
LIONEL RABB
BY
ATTORNEY

United States Patent Office 2,975,426
Patented Mar. 21, 1961

2,975,426
INTEGRAL ONE-PIECE FOLDING OPTICAL FRAME
Lionel Rabb, Pawtucket, R.I.
(12 Cross St., Central Falls, R.I.)
Filed Dec. 9, 1959, Ser. No. 858,452
3 Claims. (Cl. 2—13)

My present invention relates to ophthalmic mountings and more particularly to a foldable optical frame having an integral construction.

The principal object of the present invention is to provide an optical frame, more particularly a frame for sunglasses which can be readily molded in a single integral construction.

A further object of the present invention is to provide an optical frame having an integral construction which can be folded into a small compact carrying case.

Another object of the present invention is to provide a sunglass frame which can be readily molded of plastic material and provided with plastic lenses to form a simple foldable construction.

Another object of the present invention is to provide a small foldable sunglass frame construction which can be made economically with a minimum of manual assembly operations.

With the above and other objects and advantageous features in view, my invention consists of a novel arrangement of parts more fully disclosed in the detailed description following, in conjunction with the accompanying drawings and more particularly defined in the appended claims.

Figure 1:
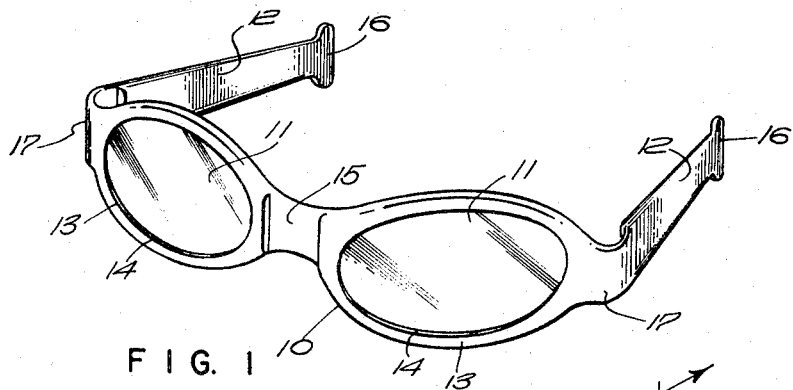
Fig. 1 is a perspective view of a pair of sunglasses embodying my present invention in open position.

Sunglasses are usually constructed like ordinary optical frames with the main body portion of rigid metal or plastic material designed to hold the lenses and with temple pieces hinged to each side of the main body portion. The material, labor and assembly costs are almost identical with the manufacture of ordinary eyeglasses. The present invention is designed to provide a novel pair of sunglasses which can readily be folded into a tiny compact case and which reduces labor and assembly costs to an absolute minimum.

The sunglasses of the present invention are designed to be molded of a single integral unitary piece of plastic material. It is also preferable that the lenses be made of plastic material. With the construction of the present invention the only assembly operation involved is the positioning of the lenses in the frame.

Referring more in detail to the drawings, the sunglasses of the present invention comprise a frame 10, lenses 11 and temple pieces 12. It will be noted that it is desirable to make the sunglasses of the present invention small and that the frame and lenses are elongated flattened ovals. The frame 10 and temple pieces 11 are molded of a soft plastic material such as polyethylene in a single integral piece. They comprise thickened lens portions 13 provided with grooves 14 into which the lenses 11 are set by snapping them into position. The lenses are held in place by the resilency of the material. The lens portions 13 are connected in the center by a thin integral strip 15.

The temple members 12 comprise thick lengths of plastic material having T-shaped ends 16 with each connected to the outside edge of the lens portions 13 by a thin integral strip 17. The length of each temple piece 12 is equal to the distance from the strip 17 to the center of the connecting strip 15. This provides a comparatively short temple piece. When the sunglasses are put on the T-shaped ends 16 will not reach the ears but will terminate in the center of the wearer's temples. The T-shaped ends 16 are designed to press against the temples to frictionally hold the sunglasses in place.

Figure 2:
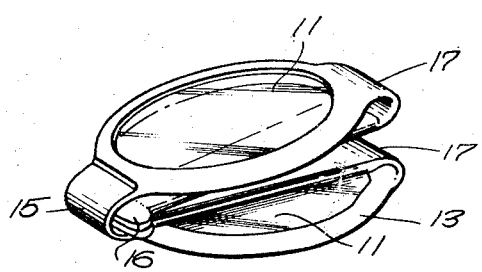
Fig. 2 is a perspective view of the sunglasses in folded position.

After being molded in flat position the frame 10 is bent into the folded position shown in Fig. 2. Each temple piece 12 is folded inwardly so that the ends 16 extend to the strip 15. The strip 15 is then bent so that the lenses fold towards each other with the temple pieces therebetween. Heat is now applied to set the polyethylene in this position. It will then be found that when the sunglasses are opened into the position shown in Fig. 1, the bent strip portions 15 and 17 will resist the opening movement with a resilient spring action and tend to pull the ends of the temple pieces 12 inwardly. Thus if the sunglasses are placed on the nose of the wearer the temple pieces will be pushing inwardly against the wearer's temples to hold the sunglasses in place.

Figure 3:
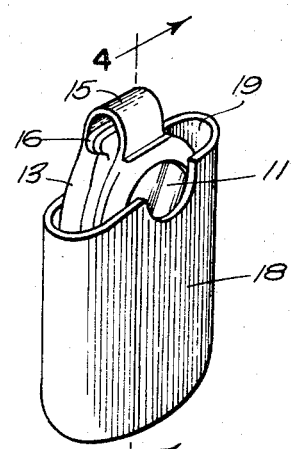
Fig. 3 is a perspective view of the folded sunglasses inserted in a compact carrying case.
Figure 4:
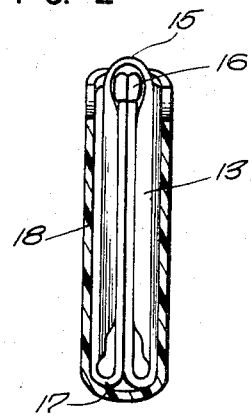
Fig. 4 is a section taken on line 4—4 on Fig. 3.
Figure 5:
Fig. 5 is a section taken on line 5—5 on Fig. 2.

A small case 18, shown in Figs. 3 and 4 is provided with an opening 19 which permits the folded sunglasses shown in Fig. 2 to be slipped inwardly. The drawings are in full size and it can thus be readily seen that the folded sunglasses take up very little space for carrying in the pocket.

The construction of the present invention thus eliminates separate temple pieces with separate hinges and eliminates separate nose pieces. The frame coming from the mold is folded into the position shown in Fig. 2, set into position by heat and then completed by snapping the lenses into the grooves 14 by slightly stretching the frame material. Thus an extremely economical and inexpensive construction is provided with a minimum number of parts. The sunglasses are extremely compact taking up very little pocket space. Other advantages of the present invention will be readily apparent to a person skilled in the art.

I claim:

1. A folding optical frame comprising an integral one-piece frame of plastic material having a pair of comparatively thick lens portions connected by a comparatively thin integral flexible web of plastic material, a pair of flat thick temple members each integrally connected to the outer end of one of said lens portions by an integral thin flexible web of plastic material, and a lens mounted in each of said lens portions, said webs of plastic material being heat conditioned to force said temple members and said lens portions into folded position to provide a resilient tension on said temple members in open position.

2. A folding optical frame comprising an integral one-piece frame of plastic material having a pair of comparatively thick lens portions connected by a comparatively thin integral flexible web of plastic material, a pair of flat thick temple members each integrally connected to the outer end of one of said lens portions by an integral thin flexible web of plastic material, and a lens mounted in each of said lens portions, said temple members are adapted to fold inwardly toward said lens portions and said lens portions are adapted to fold toward each other to completely fold said frame, said webs of plastic material being heat conditioned to force said temple members and said lens portions into folded position to provide a resilient tension on said temple members in open portion.

3. A folding optical frame comprising an integral one-piece frame of plastic material having a pair of comparatively thick lens portions connected by a comparatively thin integral flexible web of plastic material, a pair of flat thick temple members each integrally connected to the outer end of one of said lens portions by an integral thin flexible web of plastic material, and a lens mounted in each of said lens portions, said lens portions having grooves, said lenses snapping into said grooves, said webs of plastic material being heat conditioned to force said temple members and said lens portions into folded position to provide a resilient tension on said temple members in open position.

References Cited in the file of this patent

UNITED STATES PATENTS

| | | |
|---|---|---|
| 272,450 | Manning | Feb. 20, 1883 |
| 715,533 | Anderson | Dec. 9, 1902 |
| 1,159,751 | Day | Nov. 9, 1915 |
| 2,430,881 | Lehmberg | Nov. 18, 1947 |

FOREIGN PATENTS

| | | |
|---|---|---|
| 18,687 | Great Britain | Feb. 9, 1895 |